(12) United States Patent
Blackham et al.

(10) Patent No.: US 8,702,231 B1
(45) Date of Patent: Apr. 22, 2014

(54) SNAP-ON SUNGLASSES (76) Inventors: George Blackham, Weymouth, MA (US); Nancy M. Blackham, Weymouth, MA (US)

( * ) Notice: Subject to any disclaimer, the term of this patent is extended or adjusted under 35 U.S.C. 154(b) by 61 days.

(21) Appl. No.: 13/447,227

(22) Filed: Apr. 15, 2012

(51) Int. Cl.
*G02C 9/00* (2006.01)
*G02C 9/04* (2006.01)
*G02C 7/08* (2006.01)

(52) U.S. Cl.
CPC ... *G02C 9/00* (2013.01); *G02C 9/04* (2013.01)
USPC .................. 351/47; 351/48; 351/57; 351/58; D16/900

(58) Field of Classification Search
USPC ......................................... 351/47–48, 57–58
See application file for complete search history.

(56) References Cited

U.S. PATENT DOCUMENTS

| | | | |
|---|---|---|---|
| 2,574,749 A | 11/1951 | Hendelsohn | |
| 2,678,584 A | 5/1954 | Eyles | |
| 4,247,178 A | 1/1981 | Cook | |
| 4,976,530 A | 12/1990 | Mackay et al. | |
| 5,477,281 A | 12/1995 | Boyer | |
| 5,546,140 A | 8/1996 | Underwood | |
| 6,224,207 B1 | 5/2001 | Shelton | |
| D451,532 S | 12/2001 | Bondy | |
| 6,557,997 B1 | 5/2003 | Sieberg | |
| 6,685,314 B1 | 2/2004 | Friedman | |
| 7,364,287 B2 * | 4/2008 | Lee et al. | 351/47 |
| D568,372 S | 5/2008 | Shapiro | |
| 2002/0093621 A1 * | 7/2002 | Zelman | 351/47 |
| 2010/0060846 A1 * | 3/2010 | Zelazowski | 351/57 |

* cited by examiner

*Primary Examiner* — Scott J Sugarman
*Assistant Examiner* — Daniele Manikeu
(74) *Attorney, Agent, or Firm* — Richard L Miller (57) ABSTRACT

Sunglasses replaceably attached to conventional spectacles. The sunglasses include a frame, a pair of tinted lenses, and two pair of attachments. The frame replaceably attaches to a frame of the conventional spectacles. The pair of tinted lenses are attached in the frame. The two pair of attachments extend from the frame and replaceably snap the sunglasses onto the frame of the conventional spectacles to eliminate inadvertent movement of the sunglasses relative to the conventional spectacles during use without impinging upon hinges of the frame of the conventional spectacles so as to allow the sunglasses to fold with the conventional spectacles.

11 Claims, 4 Drawing Sheets

SNAP-ON SUNGLASSES

1. BACKGROUND OF THE INVENTION

A. Field of the Invention

The embodiments of the present invention relate to sunglasses, and more particularly, the embodiments of the present invention relate to sunglasses for replaceably attaching to conventional spectacles having a frame with a front and a pair of temples attached to the front of the frame of the conventional spectacles by hinges[1] by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles.

[1] Please see *What's What*, David Fisher et al., Hammond Inc. Maplewood, N.J. 1990. p. 221. Thank you.

B. Description of the Prior Art

Numerous innovations for snap-on sunglasses have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach sunglasses for replaceably attaching to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles.

(1) U.S. Pat. No. 2,574,749 to Hendelsohn.

U.S. Pat. No. 2,574,749—issued to Hendelsohn on Nov. 13, 1951 in U.S. class 351 and subclass 48—teaches Clip-on sunglasses including a glare shield provided centrally along its upper margin with a frame bar having projecting bosses, and separate pintles mounted in, and projecting from, the bosses in a plane parallel to the plane of the glare shield. The inner ends of the pintles are upset. The pintles extend outwardly from their respective bosses at an angle to each other. Attachment clips have quill portions. The pintles extend loosely through the quill portions, whereby the clips are swung in relation to the glare shield. The clips are further provided with forwardly curved central portions, whereby the glare shield is maintained in spaced relation to spectacles held by the clips when the shield is in a downward position.

(2) U.S. Pat. No. 2,678,584 to Eyles.

U.S. Pat. No. 2,678,584—issued to Eyles on May 18, 1954 in U.S. class 351 and subclass 48—teaches a sunglass of the clip-on type, which includes a pair of lenses of plastic material having integral hooks for attaching them to a frame to which they are to be applied. A spring bridge connects the two lenses. The bridge has a downward substantially right angled bend at each end. A socket is on the upper edge of, and integral with, each lens. The socket has a substantially right angled cavity normally open along one side to receive the end portions of the spring bridge, and has parallel upper and lower walls. The lower wall has a shoulder along the normally open side of the cavity. The upper wall has an extended portion that projects beyond the shoulder, and is of a length to be rolled down, with its outer end seated on the shoulder to enclose the spring bridge ends firmly in place.

(3) U.S. Pat. No. 4,247,178 to Cook.

U.S. Pat. No. 4,247,178—issued to Cook on Jan. 27, 1981 in U.S. class 351 and subclass 47—teaches a snap-on construction for sunglasses of the type used with wire frame spectacles having a reinforcing wire or bar extending from the upper edge of one spectacle lens to the upper edge of the other lens. The sunglasses include a support frame member to which the pair of lenses are secured at least at an upper portion thereof, and a pair of spaced posts extend rearwardly from the support frame. Each post includes a slot opening into the rear end thereof for receiving the reinforcing bar of the wire frames, and a locking bar selectively snaps into the slots behind the reinforcing bar to retain the sunglasses assembled on the spectacles.

(4) U.S. Pat. No. 4,976,530 to Mackay et al.

U.S. Pat. No. 4,976,530—issued to Mackay et al. on Dec. 11, 1990 in U.S. class 351 and subclass 44—teaches plastic sunglasses including a transparent lens piece, a pair of temple pieces attached to the ends of the lens piece, and an opaque visor that snap-locks onto the top of the lens piece. The visor has a long curved front face with L-shaped ends, an angular top face for projecting inwardly across the top of the lens piece, and separate hooks projecting inwardly from the inner ends of the visor behind corresponding L-shaped shoulders. A visor connector at the top of the lens piece includes a curved upright wall with generally L-shaped ends. The wall is recessed from a curved ridge, with generally L-shaped ends extending across the front of the lens piece. The opposite ends of the visor connector include L-shaped slots in its bottom front face that interlock with the L-shaped shoulders on the bottom inside face of the visor. The visor is interlocked with the visor connector by engaging the shoulder at one end of the visor with a corresponding slot on the lens piece, engaging the hook at the opposite end of the visor with a rear edge of the lens connector wall, and pressing down on the opposite end of the visor so the hook and shoulder move downwardly and apply tension to the end of the visor until the shoulder in front of the hook snap-locks into the slot at the opposite end of the visor connector.

(5) U.S. Pat. No. 5,477,281 to Boyer.

U.S. Pat. No. 5,477,281—issued to Boyer on Dec. 19, 1995 in U.S. class 351 and subclass 128—teaches snap-on sunglasses including a first sunglass lens support assembly that supports a first lens frame portion. A first sunglass lens is supported by the first lens frame portion, and a first clamping arm assembly is supported by the first lens frame portion. A second sunglass lens support assembly supports a second lens frame portion. A second sunglass lens is supported by the second lens frame portion, and a second clamping arm assembly is supported by the second lens frame portion. The respective first and second clamping arm assemblies include respective clamping ends. A first variable length alignment assembly is connected between the first sunglass lens and the second sunglass lens for maintaining the lenses in substantial co-linear alignment. A second variable length alignment assembly is connected between the first lens frame portion and the second lens frame portion for maintaining the frame portions in substantial collinear alignment. A tension-exerting assembly that includes a spring is connected between the first sunglass lens support assembly and the second sunglass lens support assembly. The tension-exerting assembly urges the first sunglass lens support assembly and the second sunglass lens support assembly toward each other so that the first clamping arm assembly and the second clamping arm assembly clamp against the frame of the eyeglasses. A plurality of suction cups are connected to the respective clamping arm assemblies. The effective lengths of the respective clamping arm assemblies are adjustable.

(6) U.S. Pat. No. 5,546,140 to Underwood.

U.S. Pat. No. 5,546,140—issued to Underwood on Aug. 13, 1996 in U.S. class 351 and subclass 47—teaches clip-on sunglasses and an apparatus for custom cutting the clip-on sunglasses. The system includes a holder that assists in positioning the sunglasses on the system. The sunglasses include a pair of lenses interconnected by a bridge specifically dimensioned to be received by the holder. The bridge and holder are intended to be used in combination to produce custom clip-on sunglasses that form in shape and size to the frame of the eyeglasses.

(7) U.S. Pat. No. 6,224,207 to Shelton.

U.S. Pat. No. 6,224,207—issued to Shelton on May 1, 2001 in U.S. class 351 and subclass 47—teaches a clip-on sunglass assembly for positioning clip-on lenses with respect to spectacles worn by a consumer, which includes a central body, a first pair of clamping arms extending from the central body, with the first pair of clamping arms including a central region and arm extensions, a second pair of clamping arms extending from the central body, with the second pair of clamping arms also including a central region and arm extensions in an opposed position with respect to the first pair of clamping arms, a support rail for supporting the lenses mounted on the central body, and a spring for biasing the central regions of the first and second pair of clamping arms away from one another and the arm extensions of the first and second clamping arms toward one another for securing the clip-on sun glass assembly with respect to the spectacles.

(8) U.S. Pat. No. Des. 451,532 to Bondy.

U.S. Pat. No. Des. 451,532—issued to Bondy on Dec. 4, 2001 in U.S. class D16 and subclass 304—teaches the ornamental design for clip-on sunglasses.

(9) U.S. Pat. No. 6,557,997 to Sieberg.

U.S. Pat. No. 6,557,997—issued to Sieberg on May 6, 2003 in U.S. class 351 and subclass 47—teaches clip-on sunglasses having a pair of lenses with mounting holes. A pair of bridge clips are integrally joined at opposing ends of a bridge wire. A mounting tongue of each of the bridge clips is engaged with one of the mounting holes for securing the bridge wire to the lenses using the bridge clips. Upper mounting snaps are engaged with the bridge clips and the mounting hole. Each one of a pair of lower mounting snaps is engaged with a further one of the mounting holes in each of the lenses. The upper and lower mounting snaps each provide a hooked finger extending therefrom. The hooked fingers is positioned for engagement about opposing edges of a pair of eyeglasses enabling the lenses to be removably engaged over front surfaces of the eyeglasses.

(10) U.S. Pat. No. 6,685,314 to Friedman.

U.S. Pat. No. 6,685,314—issued to Friedman on Feb. 3, 2004 in U.S. class 351 and subclass 128—teaches lens sections of a sunglasses being joined by a spring mechanism. The mechanism includes first and second concentric tubular members. Each member is affixed to the rim of a different one of the lens sections. The members enclose the spring that urges the lens sections toward each other so that prongs mounted on the rims engage an eyeglasses frame to mount the sunglasses thereon.

(11) U.S. Pat. No. Des. 568,372 to Shapiro.

U.S. Pat. No. Des. 568,372—issued to Shapiro on May 6, 2008 in U.S. class D16 and subclass 330—teaches the ornamental design for clip-on sunglasses.

It is apparent that numerous innovations for snap-on sunglasses have been provided in the prior art, which are adapted to be used. Furthermore, even though these innovations may be suitable for the specific individual purposes to which they address, nevertheless, they would not be suitable for the purposes of the embodiments of the present invention as heretofore described, namely, sunglasses for replaceably attaching to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles.

2. SUMMARY OF THE INVENTION

Thus, an object of the embodiments of the present invention is to provide sunglasses for replaceably attaching to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles, which avoids the disadvantages of the prior art.

Briefly stated, another object of the embodiments of the present invention is to provide sunglasses replaceably attached to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles. The sunglasses include a frame, a pair of tinted lenses, and two pair of attachments. The frame is replaceably attached to the frame of the conventional spectacles. The pair of tinted lenses are attached in the frame. The two pair of attachments extend from the frame, and replaceably snap the sunglasses onto the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

A. Introductory.

10 sunglasses of embodiments of present invention for replaceably attaching to conventional spectacles 12 having frame 14 with front 16 and pair of temples 18 attached to front 16 of frame 14 of conventional spectacles 12 by hinges 20 by replaceably snapping onto not only front 16 of frame 14 of conventional spectacles 12 but also pair of temples 18 of frame 14 of conventional spectacles 12 to eliminate inadvertent movement of sunglasses 10 relative to conventional spectacles 12 during use without impinging upon hinges 20 of frame 14 of conventional spectacles 12 so as to allow sunglasses 10 to fold with conventional spectacles 12

12 conventional spectacles
14 frame of conventional spectacles 12
16 front of frame 14 of conventional spectacles 12
18 pair of temples of frame 14 of conventional spectacles 12
20 hinges of frame 14 of conventional spectacles 12

B. Overall configuration of sunglasses 10.

22 frame for replaceably attaching to frame 14 of conventional spectacles 12.
24 pair of tinted lenses
26 two pair of attachments for replaceably snapping sunglasses 10 onto frame 14 of conventional spectacles 12 to eliminate inadvertent movement of sunglasses 10 relative to conventional spectacles 12 during use without impinging upon hinges 20 of frame 14 of conventional spectacles 12 so as to allow sunglasses 10 to fold with conventional spectacles 12
28 pair of spacers for spacing pair of tinted lenses 24 away from, so as to protect, pair of lenses 13 of conventional spectacles 12

C. Specific configuration of frame 22 and pair of tinted lenses 24.

(1) Frame 22.

30 front of frame 22
31 outer portion of each eyewire of pair of eyewires of front 30 of frame 22
32 pair of eyewires of front 30 of frame 22
33 top portion of each eyewire of pair of eyewires of front 30 of frame 22

D. Specific configuration of first pair of attachments 34 of two pair of attachments 26.

34 first pair of attachments of two pair of attachments 26
36 pair of center hooks of first pair of attachments 34 of two pair of attachments 26 for replaceably and snapingly engaging top portion 38 of front 16 of frame 14 of conventional spectacles 12
38 top portion of front 16 of frame 14 of conventional spectacles 12

E. Specific configuration of second pair of attachments 40 of two pair of attachments 26.

40 second pair of attachments of two pair of attachments 26
42 pair of arms of second pair of attachments 40 of two pair of attachments 26 for being positioned below pair of temples 18 of frame 14 of conventional spectacles 12, respectively 44 pair of hooks of second pair of attachments 40 of two pair of attachments 26 for replaceably and snapingly engaging pair of temples 18 of frame 14 of conventional spectacles 12, respectively 46 straight portion of each arm of pair of arms 42 of second pair of attachments 40 of two pair of attachments 26 for being generally parallel to, and positioned below, associated temple 18 of frame 14 of conventional spectacles 12

48 slanted downward portion of each arm of pair of arms 42 of second pair of attachments 40 of two pair of attachments 26 for being positioned below associated temple 18 of frame 14 of conventional spectacles 12 for allowing associated hook 44 of pair of hooks 44 of second pair of attachments 40 of two pair of attachments 26 to "bottom-out" on associated temple 18 of frame 14 of conventional spectacles 12

F. Specific configuration of pair of spacers 28.

50 clear stick-on tab of each spacer of pair of spacers 28 for spacing pair of tinted lenses 24 away from, so as to protect, pair of lenses 13 of conventional spectacles 12 without hindering visibility through pair of tinted lenses 24

52 lowermost portion of associated tinted lense of pair of tinted lenses 24

5. DETAILED DESCRIPTION OF THE PREFERRED EMBODIMENTS

A. Introductory.

Figure 1:
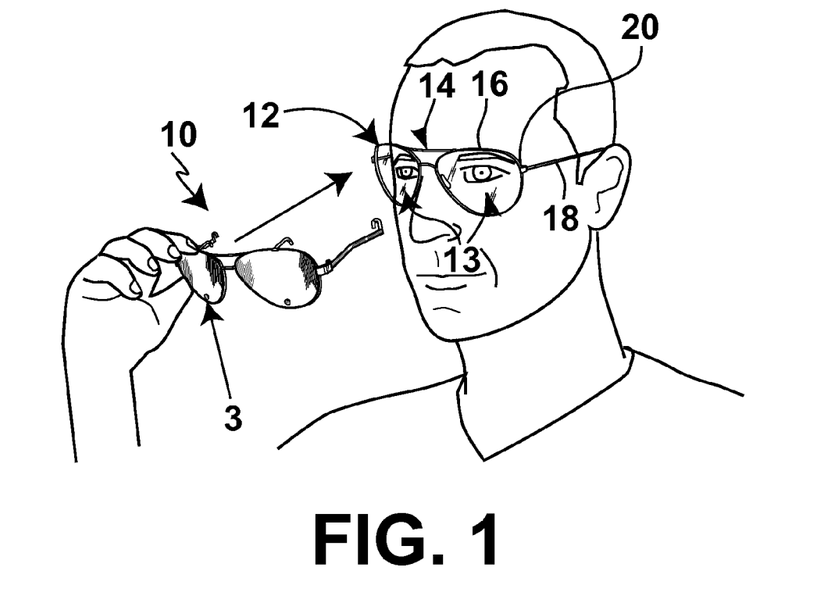
FIG. 1 is a diagrammatic perspective view of the sunglasses of the embodiments of the present invention prior to being replaceably attached to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles.
Figure 2:
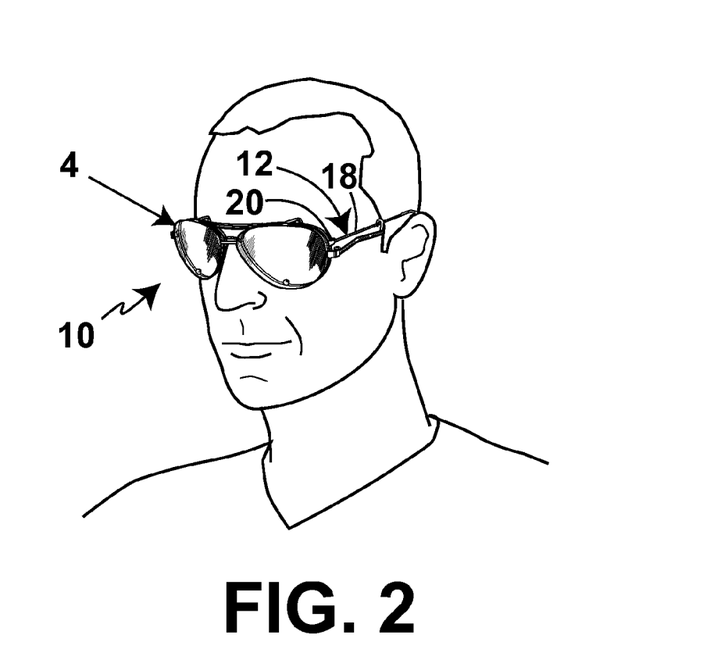
FIG. 2 is a diagrammatic perspective view of the sunglasses of the embodiments of the present invention replaceably attaching to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles.

Referring now to the figures, in which like numerals indicate like parts, and particularly to FIGS. 1 and 2, which are, respectively, a diagrammatic perspective view of the sunglasses of the embodiments of the present invention prior to being replaceably attached to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles, and a diagrammatic perspective view of the sunglasses of the embodiments of the present invention replaceably attaching to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles, the sunglasses of the embodiments of the present invention is shown generally at 10 for replaceably attaching to conventional spectacles 12 having a pair of lenses 13 and a frame 14 with a front 16 and a pair of temples 18 attached to the front 16 of the frame 14 of the conventional spectacles 12 by hinges 20 by replaceably snapping onto not only the front 16 of the frame 14 of the conventional spectacles 12 but also the pair of temples 18 of the frame 14 of the conventional spectacles 12 to eliminate inadvertent movement of the sunglasses 10 relative to the conventional spectacles 12 during use without impinging upon the hinges 20 of the frame 14 of the conventional spectacles 12 so as to allow the sunglasses 10 to fold with the conventional spectacles 12.

B. Overall configuration of the sunglasses 10.

Figure 3:
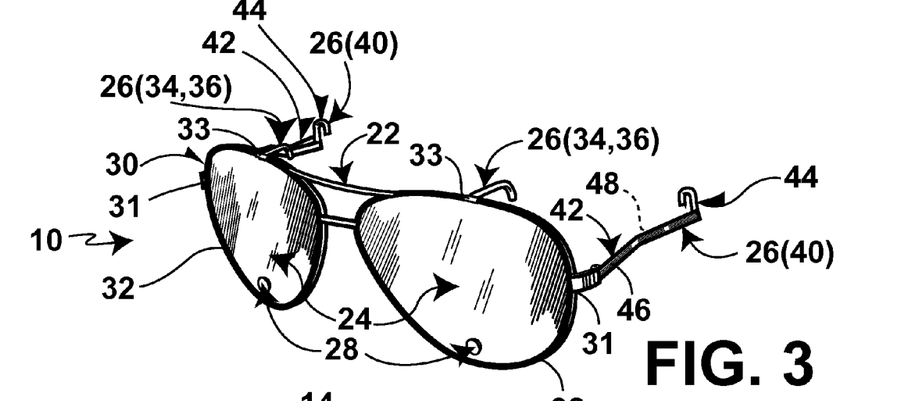
FIG. 3 is an enlarged diagrammatic perspective view of the sunglasses of the embodiments of the present invention identified by ARROW 3 in FIG. 1.
Figure 4:
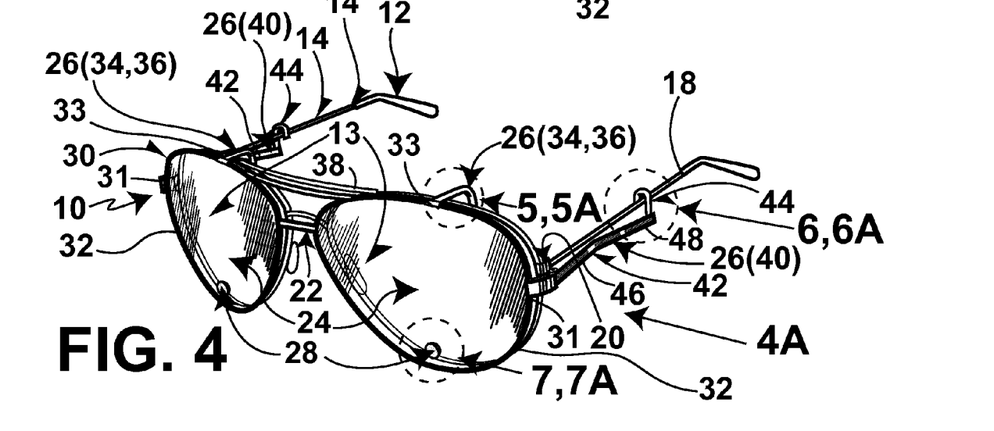
FIG. 4 is an enlarged diagrammatic perspective view of the sunglasses of the embodiments of the present invention replaceably attaching to conventional spectacles identified by ARROW 4 in FIG. 2.
Figure 4A:
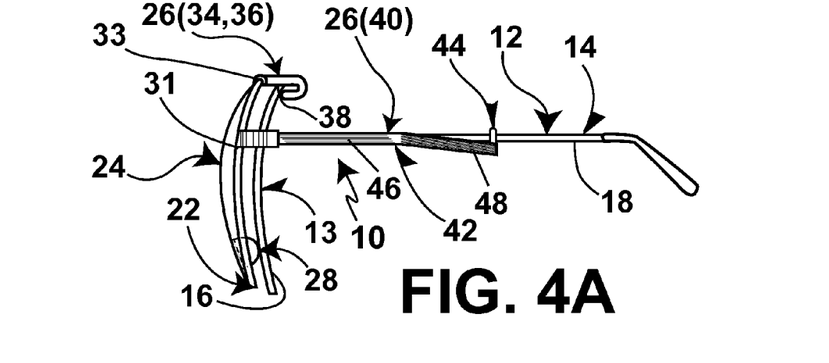
FIG. 4A is a diagrammatic side elevational view taken generally in the direction of ARROW 4A in FIG. 4.
Figures 5, 5A:
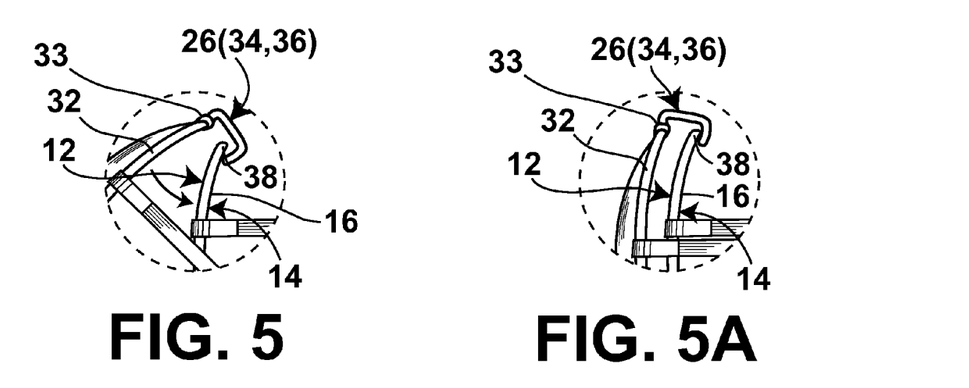
FIG. 5 is a diagrammatic side elevational view of the area generally enclosed by the dotted curve identified by ARROW 5 in FIG. 4 of a center hook of the sunglasses of the embodiments of the present invention in the process of being attached to the conventional spectacles.
FIG. 5A is a diagrammatic side elevational view of the area generally enclosed by the dotted curve identified by ARROW 5A in FIG. 4 of a center hook of the sunglasses of the embodiments of the present invention attached to the conventional spectacles.
Figure 6:
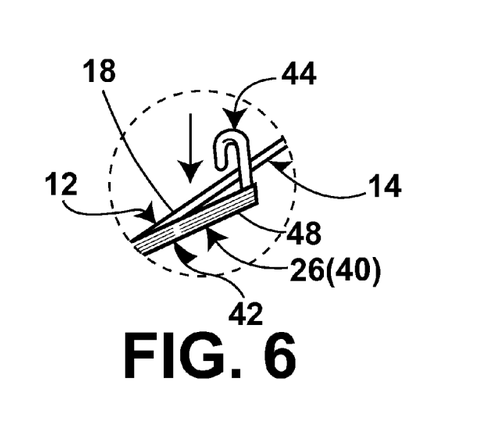
FIG. 6 is a diagrammatic side elevational view of the area generally enclosed by the dotted curve identified by ARROW 6 in FIG. 4 of an arm hook of the sunglasses of the embodiments of the present invention in the process of being attached to the conventional spectacles.
Figure 6A:
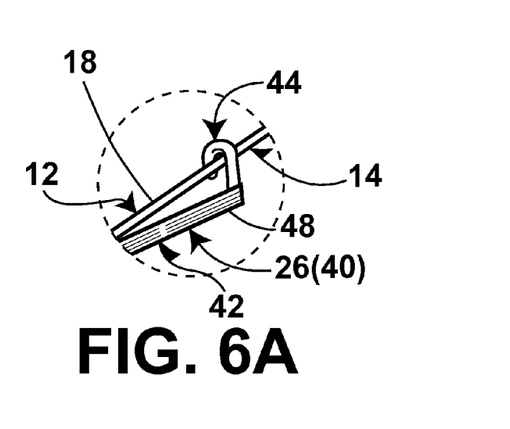
FIG. 6A is a diagrammatic side elevational view of the area generally enclosed by the dotted curve identified by ARROW 6A in FIG. 4 of an arm hook of the sunglasses of the embodiments of the present invention attached to the conventional spectacles.

The overall configuration of the sunglasses 10 can best be seen in FIGS. 3, 4, and 4A, which are, respectively, an enlarged diagrammatic perspective view of the sunglasses of the embodiments of the present invention identified by ARROW 3 in FIG. 1, an enlarged diagrammatic perspective view of the sunglasses of the embodiments of the present invention replaceably attaching to conventional spectacles identified by ARROW 4 in FIG. 2, and a diagrammatic side elevational view taken generally in the direction of ARROW 4A in FIG. 4, and as such, will be discussed with reference thereto.

The sunglasses 10 comprises a frame 22, a pair of tinted lenses 24, and two pair of attachments 26. The frame 22 is for replaceably attaching to the frame 14 of the conventional spectacles 12. The pair of tinted lenses are attached in the frame 22. The two pair of attachments 26 extend from the frame 22 and are for replaceably snapping the sunglasses 10 onto the frame 14 of the conventional spectacles 12 to eliminate inadvertent movement of the sunglasses 10 relative to the conventional spectacles 12 during use without impinging upon the hinges 20 of the frame 14 of the conventional spectacles 12 so as to allow the sunglasses 10 to fold with the conventional spectacles 12.

The sunglasses 10 further comprises a pair of spacers 28. The pair of spacers 28 are disposed on the pair of tinted lenses 24, respectively, and are for spacing the pair of tinted lenses 24 away from, so as to protect, the pair of lenses 13 of the conventional spectacles 12.

C. Specific configuration of the frame 22 and the pair of tinted lenses 24.

The specific configuration of the frame 22 and the pair of tinted lenses 24 can best be seen in FIGS. 3 and 4, which are, respectively, again an enlarged diagrammatic perspective view of the sunglasses of the embodiments of the present invention identified by ARROW 3 in FIG. 1, and an enlarged diagrammatic perspective view of the sunglasses of the embodiments of the present invention replaceably attaching to conventional spectacles identified by ARROW 4 in FIG. 2, and as such, will be discussed with reference thereto.

(1) The frame 22.

The frame 22 comprises a front 30. The front 30 of the frame 22 comprises a pair of eyewires 32. Each of the pair of eyewires of the front 30 of the frame 22 has a top portion 33 and an outer side portion 31.

(2) The pair of tinted lenses 24.

The pair of tinted lenses 24 are held in the pair of eyewires 32 of the front 30 of the frame 22, respectively.

D. Specific configuration of a first pair of attachments 34 of the two pair of attachments 26.

The specific configuration of a first pair of attachments 34 of the two pair of attachments 26 can best be seen in FIGS. 3, 4, 4A, 5, and 5A, which are, respectively, again, an enlarged diagrammatic perspective view of the sunglasses of the embodiments of the present invention identified by ARROW 3 in FIG. 1, an enlarged diagrammatic perspective view of the sunglasses of the embodiments of the present invention replaceably attaching to conventional spectacles identified by ARROW 4 in FIG. 2, a diagrammatic side elevational view taken generally in the direction of ARROW 4A in FIG. 4, a diagrammatic side elevational view of the area generally enclosed by the dotted curve identified by ARROW 5 in FIG. 4 of a center hook of the sunglasses of the embodiments of the present invention in the process of being attached to the conventional spectacles, and a diagrammatic side elevational view of the area generally enclosed by the dotted curve identified by ARROW 5A in FIG. 4 of a center hook of the sunglasses of the embodiments of the present invention attached to the conventional spectacles, and as such, will be discussed with reference thereto.

The first pair of attachments 34 of the two pair of attachments 26 comprise a pair of center hooks 36. The pair of center hooks 36 of the first pair of attachments 34 of the two pair of attachments 26 extend rearwardly and downwardly from the top portion 33 of the pair of eyewires 32 of the front 30 of the frame 22, respectively, and are for replaceably and snapingly engaging a top portion 38 of the front 16 of the frame 14 of the conventional spectacles 12.

E. Specific configuration of a second pair of attachments 40 of the two pair of attachments 26.

The specific configuration of a second pair of attachments 40 of the two pair of attachments 26 can best be seen in FIGS. 3, 4, 4A, 6, and 6A, which are, respectively, again, an enlarged diagrammatic perspective view of the sunglasses of the embodiments of the present invention identified by ARROW 3 in FIG. 1, an enlarged diagrammatic perspective view of the sunglasses of the embodiments of the present invention replaceably attaching to conventional spectacles identified by ARROW 4 in FIG. 2, a diagrammatic side elevational view taken generally in the direction of ARROW 4A in FIG. 4, a diagrammatic side elevational view of the area generally enclosed by the dotted curve identified by ARROW 6 in FIG. 4 of an arm hook of the sunglasses of the embodiments of the present invention in the process of being attached to the conventional spectacles, and a diagrammatic side elevational view of the area generally enclosed by the dotted curve identified by ARROW 6A in FIG. 4 of an arm hook of the sunglasses of the embodiments of the present invention attached to the conventional spectacles, and as such, will be discussed with reference thereto.

The second pair of attachments 40 of the two pair of attachments 26 comprise a pair of arms 42 and a pair of hooks 44.

The pair of arms 42 of the second pair of attachments 40 of the two pair of attachments 26 extend rearwardly from the outer side portion 31 of the pair of eyewires 32 of the front 30 of the frame 22, respectively, terminate in the pair of hooks 44 of the second pair of attachments 40 of the two pair of attachments 26, respectively, and are for being positioned below the pair of temples 18 of the frame 14 of the conventional spectacles 12, respectively.

The pair of hooks 44 of the second pair of attachments 40 of the two pair of attachments 26 extend upwardly and inwardly from the pair of arms 42 of the second pair of attachments 40 of the two pair of attachments 26, respectively, and are for replaceably and snapingly engaging the pair of temples 18 of the frame 14 of the conventional spectacles 12, respectively.

Each of the pair of arms 42 of the second pair of attachments 40 of the two pair of attachments 26 begins with a generally straight portion 46 for being generally parallel to, and positioned below, an associated temple 18 of the frame 14 of the conventional spectacles 12, and then continues rearwardly in a slanted downward portion 48 that terminates in an associated hook 44 of the second pair of attachments 40 of the two pair of attachments 26 for allowing the associated hook 44 of the second pair of attachments 40 of the two pair of attachments 26 to "bottom-out" on the associated temple 18 of the frame 14 of the conventional spectacles 12.

F. Specific configuration of the pair of spacers 28.

Figure 7:
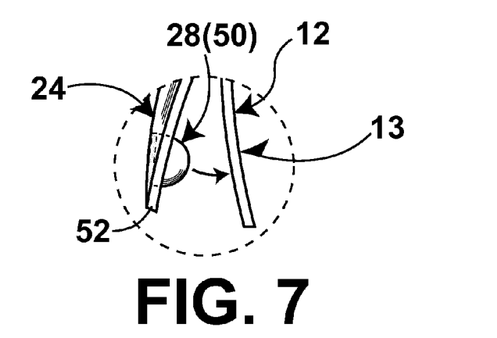
FIG. 7 is a diagrammatic side elevational view of the area generally enclosed by the dotted curve identified by ARROW 7 in FIG. 4 of a tab of the sunglasses of the embodiments of the present invention in the process of meeting the conventional spectacles.
Figure 7A:
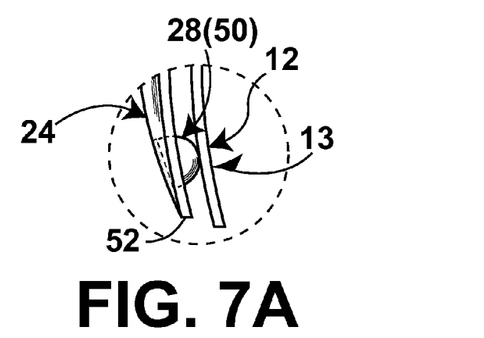
FIG. 7A is a diagrammatic side elevational view of the area generally enclosed by the dotted curve identified by ARROW 7A in FIG. 4 of a tab of the sunglasses of the embodiments of the present invention meeting the conventional spectacles.
Figure 8:
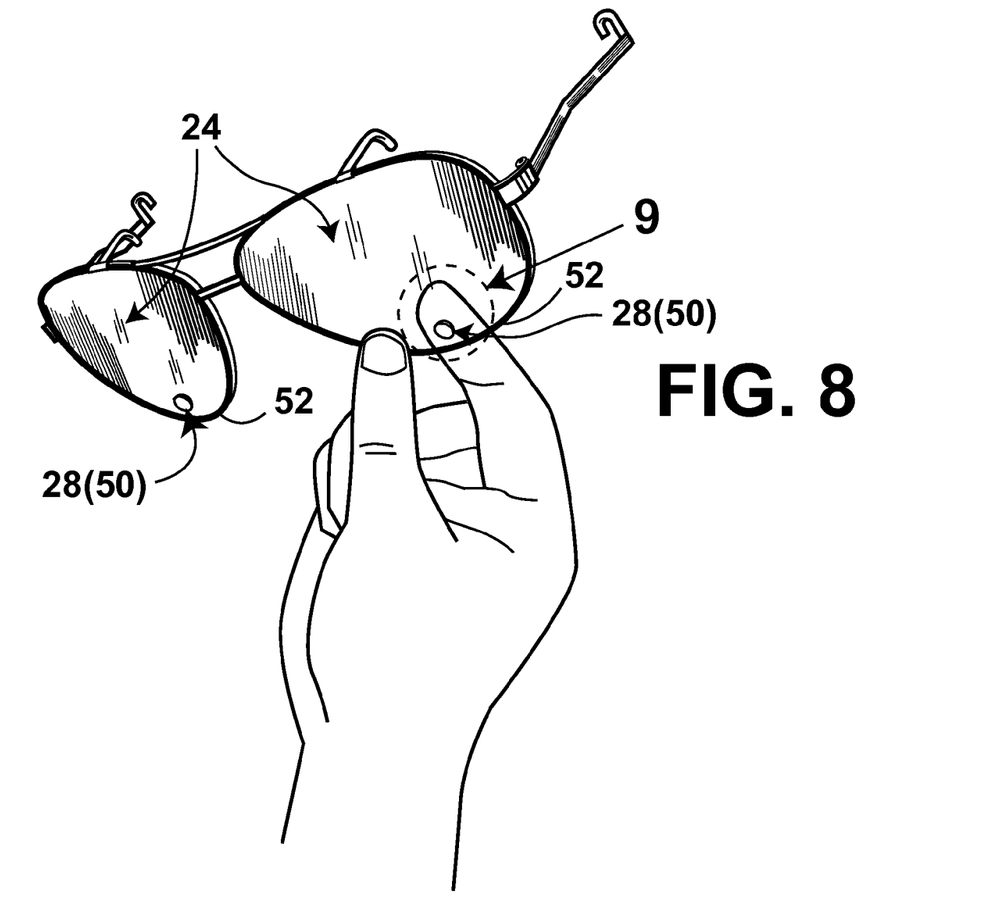
FIG. 8 is a diagrammatic perspective view of a tab of the sunglasses of the embodiments of the present invention shown in FIGS. 7 and 7A being attached to the conventional spectacles.
Figure 9:
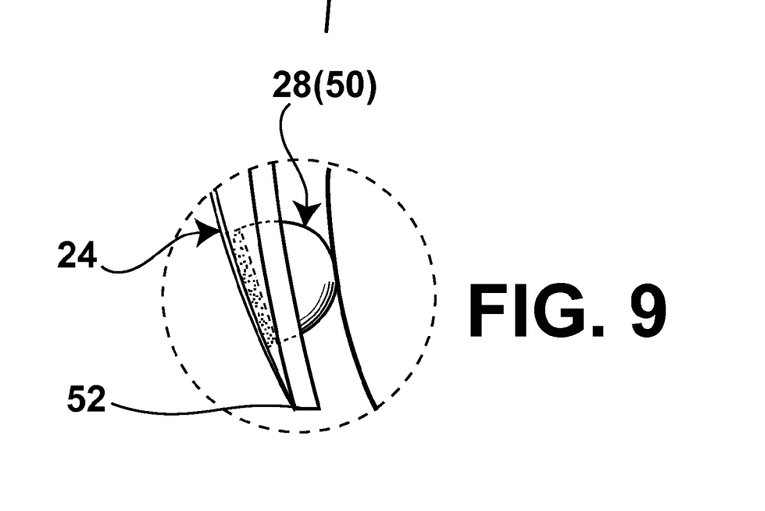
FIG. 9 is an enlarged diagrammatic side elevational view of the area generally enclosed by the dotted curve identified by ARROW 9 in FIG. 8.

The specific configuration of the pair of spacers 28 can best be seen in FIGS. 7, 7A, 8, and 9, which are, respectively, a diagrammatic side elevational view of the area generally enclosed by the dotted curve identified by ARROW 7 in FIG. 4 of a tab of the sunglasses of the embodiments of the present invention in the process of meeting the conventional spectacles, a diagrammatic side elevational view of the area generally enclosed by the dotted curve identified by ARROW 7A in FIG. 4 of a tab of the sunglasses of the embodiments of the present invention meeting the conventional spectacles, a diagrammatic perspective view of a tab of the sunglasses of the embodiments of the present invention shown in FIGS. 7 and 7A being attached to the conventional spectacles, and an enlarged diagrammatic side elevational view of the area generally enclosed by the dotted curve identified by ARROW 9 in FIG. 8, and as such, will be discussed with reference thereto.

Each spacer 28 comprises a clear stick-on tab 50. The clear stick-on tab 50 of each spacer 28 is attached to a lowermost portion 52 of an associated tinted lense 24 for spacing the pair of tinted lenses 24 away from, so as to protect, the pair of lenses 13 of the conventional spectacles 12 without hindering visibility through the pair of tinted lenses 24.

G. Impressions.

It will be understood that each of the elements described above or two or more together may also find a useful application in other types of constructions differing from the types described above.

While the embodiments of the present invention have been illustrated and described as embodied in sunglasses for replaceably attaching to conventional spectacles having a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of the sunglasses relative to the conventional spectacles during use without impinging upon the hinges of the frame of the conventional spectacles so as to allow the sunglasses to fold with the conventional spectacles, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. Sunglasses for replaceably attaching to conventional spectacles having a pair of lenses and a frame with a front and a pair of temples attached to the front of the frame of the conventional spectacles by hinges by replaceably snapping onto not only the front of the frame of the conventional spectacles but also the pair of temples of the frame of the conventional spectacles to eliminate inadvertent movement of said sunglasses relative to the conventional spectacles during use without impinging upon the hinges of the frame of the conventional spectacles so as to allow said sunglasses to fold with the conventional spectacles, said sunglasses comprising:
   a) a frame;
   b) a pair of tinted lenses;
   c) two pair of attachments; and
   d) a pair of spacers;
   wherein said frame is for replaceably attaching to the frame of the conventional spectacles;
   wherein said pair of tinted lenses are attached in said frame;

wherein said two pair of attachments extend from said frame; and wherein said two pair of attachments are for replaceably snapping said sunglasses onto the frame of the conventional spectacles to eliminate inadvertent movement of said sunglasses relative to the conventional spectacles during use without impinging upon the hinges of the frame of the conventional spectacles so as to allow said sunglasses to fold with the conventional spectacles;

wherein each spacer comprises a clear stick-on tab; and wherein said clear stick-on tab of each spacer is attached to a lowermost portion of an associated tinted lense for spacing said pair of tinted lenses away from, so as to protect, the pair of lenses of the conventional spectacles without hindering visibility through said pair of tinted lenses.

2. The sunglasses of claim 1, wherein said pair of spacers are disposed on said pair of tinted lenses, respectively; and wherein said pair of spacers are for spacing said pair of tinted lenses away from, so as to protect, the pair of lenses of the conventional spectacles.

3. The sunglasses of claim 1, wherein said frame comprises a front.

4. The sunglasses of claim 3, wherein said front of said frame comprises a pair of eyewires;

wherein each of the pair of eyewires of the front of the frame has a top portion; and wherein each of the pair of eyewires of the front of the frame has an outer side portion.

5. The sunglasses of claim 4, wherein said pair of tinted lenses are held in said pair of eyewires of said front of said frame, respectively.

6. The sunglasses of claim 4, wherein a first pair of attachments of said two pair of attachments comprise a pair of center hooks.

7. The sunglasses of claim 6, wherein said pair of center hooks of said first pair of attachments of said two pair of attachments extend rearwardly from said top portion of said pair of eyewires of said front of said frame, respectively;

wherein said pair of center hooks of said first pair of attachments of said two pair of attachments extend downwardly from said top portion of said pair of eyewires of said front of said frame, respectively;

wherein said pair of center hooks of said first pair of attachments of said two pair of attachments are for replaceably engaging a top portion of the front of the frame of the conventional spectacles; and wherein said pair of center hooks of said first pair of attachments of said two pair of attachments are for snapingly engaging said top portion of the front of the frame of the conventional spectacles.

8. The sunglasses of claim 6, wherein a second pair of attachments of said two pair of attachments comprise:
a) a pair of arms; and
b) a pair of hooks.

9. The sunglasses of claim 8, wherein said pair of arms of said second pair of attachments of said two pair of attachments extend rearwardly from said outer side portion of said pair of eyewires of said front of said frame, respectively; and wherein said pair of arms of said second pair of attachments of said two pair of attachments terminate in said pair of hooks of said second pair of attachments of said two pair of attachments, respectively, and wherein said pair of arms of said second pair of attachments of said two pair of attachments are for being positioned below the pair of temples of the frame of the conventional spectacles, respectively.

10. The sunglasses of claim 8, wherein said pair of hooks of said second pair of attachments of said two pair of attachments extend upwardly from said pair of arms of said second pair of attachments of said two pair of attachments, respectively;

wherein said pair of hooks of said second pair of attachments of said two pair of attachments extend inwardly from said pair of arms of said second pair of attachments of said two pair of attachments, respectively;

wherein said pair of hooks of said second pair of attachments of said two pair of attachments are for replaceably engaging the pair of temples of the frame of the conventional spectacles, respectively; and wherein said pair of hooks of said second pair of attachments of said two pair of attachments are for snapingly engaging the pair of temples of the frame of the conventional spectacles, respectively.

11. The sunglasses of claim 8, wherein each of said pair of arms of said second pair of attachments of said two pair of attachments begins with a generally straight portion for being generally parallel to, and positioned below, an associated temple of the frame of the conventional spectacles, and then continues rearwardly in a slanted downward portion that terminates in an associated hook of said second pair of attachments of said two pair of attachments for allowing said associated hook of said second pair of attachments of said two pair of attachments to bottom-out on the associated temple of the frame of the conventional spectacles.

\* \* \* \* \*